United States Patent [19]

Gardner

[11] Patent Number: 4,876,652

[45] Date of Patent: Oct. 24, 1989

[54] APPARATUS AND METHOD FOR CONTROLLING THE SHEAR MECHANISM OF A GLASSWARE FORMING MACHINE

[75] Inventor: E. Boyd Gardner, Bloomfield, Conn.

[73] Assignee: Emhart Industries, Inc., Farmington, Conn.

[21] Appl. No.: 273,116

[22] Filed: Nov. 16, 1988

Related U.S. Application Data

[63] Continuation of Ser. No. 76,239, Jul. 21, 1987, abandoned.

[51] Int. Cl.$^4$ .............................................. G06F 15/46
[52] U.S. Cl. .................................... 364/473; 65/174; 377/17; 364/142
[58] Field of Search ................................ 364/142–143, 364/161–163, 167–171, 473–476; 318/600–604, 626–627; 83/72; 65/160, 174; 72/22; 377/17

[56] References Cited

U.S. PATENT DOCUMENTS

| | | | |
|---|---|---|---|
| Re. 29,642 | 5/1978 | Kwiatkowski et al. | 364/143 |
| 4,408,281 | 10/1983 | Tack, Jr. et al. | 364/143 |
| 4,467,431 | 8/1984 | Gardner et al. | 364/473 |
| 4,669,040 | 5/1987 | Pettit et al. | 364/162 |

OTHER PUBLICATIONS

1985 Emhart Manual "502 Parallel Shears/Operating and Instruction Manual", author unknown (excerpts).

Primary Examiner—Allen MacDonald
Attorney, Agent, or Firm—Spencer T. Smith

[57] ABSTRACT

An improved system for controlling the operation of a cyclically moving shear mechanism, including a circuit for automatically synchronizing the cyclical actuation of a fluidic drive assembly to the timing of a related mechanism such as a glass gob feeder. The synchronizing circuit increases or decreases a "start delay time" each cycle if a Return sensor signal precedes or follows a Start signal, respectively. A count corresponding to the Start Delay period is adjusted within a single cycle by the amount required to bring the return sensor signal and the start signal back into synchronism in subsequent cycles.

2 Claims, 3 Drawing Sheets

APPARATUS AND METHOD FOR CONTROLLING THE SHEAR MECHANISM OF A GLASSWARE FORMING MACHINE

This is a continuation of co-pending application Ser. No. 76,239 filed on 7/21/87 now abandoned.

BACKGROUND OF THE INVENTION

The invention relates generally to control systems for controlling the cyclical motion of fluidically driven members. More specifically, the invention relates to a control system for controlling straight-line shear for cutting gobs from a stream of molten glass in a glassware forming machine.

The use of shears for cutting gobs from a stream of molten glass falling from a feeder of a glassware forming machine is well-known in the prior art. Such shears are generally of either the arcuate or straight-line type, each type having a cyclically oscillating single pair of opposed blades associated with a single stream of molten glass. An example of a prior art double gob shear assembly of the straight-line type is shown in U.S. Pat. No. 4,174,647, dated Nov. 20, 1979, and assigned to the assignee of the present invention. Prior art shears are generally activated by pneumatic (or fluidic) means interconnected in a complex arrangement of various valves and cylinders.

The present invention relates to an improvement over the prior art control system of commonly assigned U.S. Pat. No. 4,467,431, the disclosure of which is incorporated by reference herein. Such control system for pneumatically driven straight-line shears (such as shears of the type disclosed in the '647 patent cited above), such control system incorporating a series of sensors which produce signals representing predetermined shear positions in each shear cycle. As illustrated in FIGS. 5 and 6 at the '431 patent and the text discussing these Figures, such prior art system incorporates four sensors—a return delay sensor, a zero crossover sensor, an overlap sensor, and a cushion sensor, each of which produces an output signal at a predetermined point of the travel of the shears, for controlling various aspects of the shears, operation in accordance with the method disclosed therein. The shears are pneumatically driven in the forward (cutting) and reverse direction by selectively energizing and deenergizing (or reversing) the cylinder assembly of FIG. 3. The timing of this energization and denergization, and hence the motion profile of the shears, is determined by the timing of the return sensor and overlap sensor signals, as well as by a return delay time which is added to the return sensor signal to determine the off time of the shears' pneumatic drive.

That aspect with which the present invention is particularly concerned, i.e. the synchronization of the shears motion with other mechanisms such as a Feeder assembly, is discussed at column 7, line 31—column 10, line 28, with reference to FIGS. 8 and 9 of the '431 patent. The Start Delay Timer circuit 16 of '431 FIG. 8 is included herein as FIG. 3 for convenient reference. The set-up circuit 18 of FIG. 9 modifies the operation of the start-delay timer 16 of FIG. 8 during initialization, in order to approximate in the latter circuit the conditions of actual operation. Set-up circuit 18 causes the up-down counter 312 (FIG. 8) to count up during the period between first and second "sync pulses", and down for a prescribed time period ("shear response time"). Thus, with particular reference to the prior art shears displacement plot of FIG. 1 herein, the count in up-down counter 312 represents the "delayed start time" 230 between the "on" time 204 of each cycle and the sync pulse of the preceding cycle in the upper of the two start/sync. timing diagrams. This sync pulse is aligned with the zero crossover point 12 and the Shear Response Time 220 was defined as time between energizing the shear mechanism (on time 204) and the zero crossover point 220.

The start delay timer 16 of the system of U.S. Pat. No. 4,467,431 is designed to maintain the leading edge of the sync pulse (beginning of "start delay time38 ) with the leading edge 212 of the zero crossover signal. Up/down counter 312 (defining the "start delay time38 ) will be either incremented or decremented by a single clock pulse each cycle depending on whether the sync pulse follows or precedes the zero crossover signal.

As an improvement to the assignee's commercial system based upon the invention of the '431 patent, the circuits of '431 FIGS. 8 and 9 were chronize the start time to the leading edge of the return sensor signal (point 206 in FIG. 1) rather than that of the zero crossover signal. This is illustrated by the "modified start-/sync." timing diagram of FIG. 1. In this modification, the shear response time 220' was measured from the on time 204 and the leading edge of the Return Sensor Signal, and the Start Delay Time 230', occupied the balance of the cycle. This arrangement improved the reliability of synchronization, in that point 206 is at a more uniformly increasing portion of the displacement profile. However, this system suffered the same shortcoming as encountered in that of the '431 patent—i.e. that in the event of a significant shift of the speed of the mechanism from which the start pulse was obtained, such as a glass gob feeder assembly, the shears sometimes required hundreds of cycles to achieve the appropriate new Start Delay time.

Accordingly, it is the principal object of the invention to provide an improved system for synchronizing the cyclical actuation of a fluidically driven shear mechanism to a related mechanism such as a glass gob feeder. As a related object, such improved synchronizing system should be adaptable to other fluidically driven mechanisms of a glassware forming machine.

SUMMARY OF THE INVENTION

In furthering the above and additional objects, the invention provides improved method and apparatus for controlling the energizing means of a cyclically driven member such as a fluidically driven shear mechanism, wherein the actuation time of said energizing means is synchronized to an externally generated sync signal. An improved control system in accordance with the invention include means for producing a sync signal at a predetermined first time in each cycle; means responsive to said sync signal for producing a start signal output at a predetermined second time in each cycle and for actuating the energizing means or response to said start signal output; means for sensing the position of said member and for producing a first signal output when said member is at a predetermined position in each cycle; means for determining which of said first signal and said sync signal occurs first in each cycle; and means for adjusting said predetermined second time by an amount equal to the time lag between said first-occurring signal and the time of the other of these two signals. This adjustment brings the first signal and the sync signal into synchronism in the space of a single cycle, thus permitting the control for the cyclically driven member to immediately adjust to speed changes of the externally generated sync signal.

BRIEF DESCRIPTION OF THE DRAWINGS

The invention is illustrated in its preferred embodiment in the following detailed description, which should be taken together with the drawings in which.

DETAILED DESCRIPTION

Figure 2:
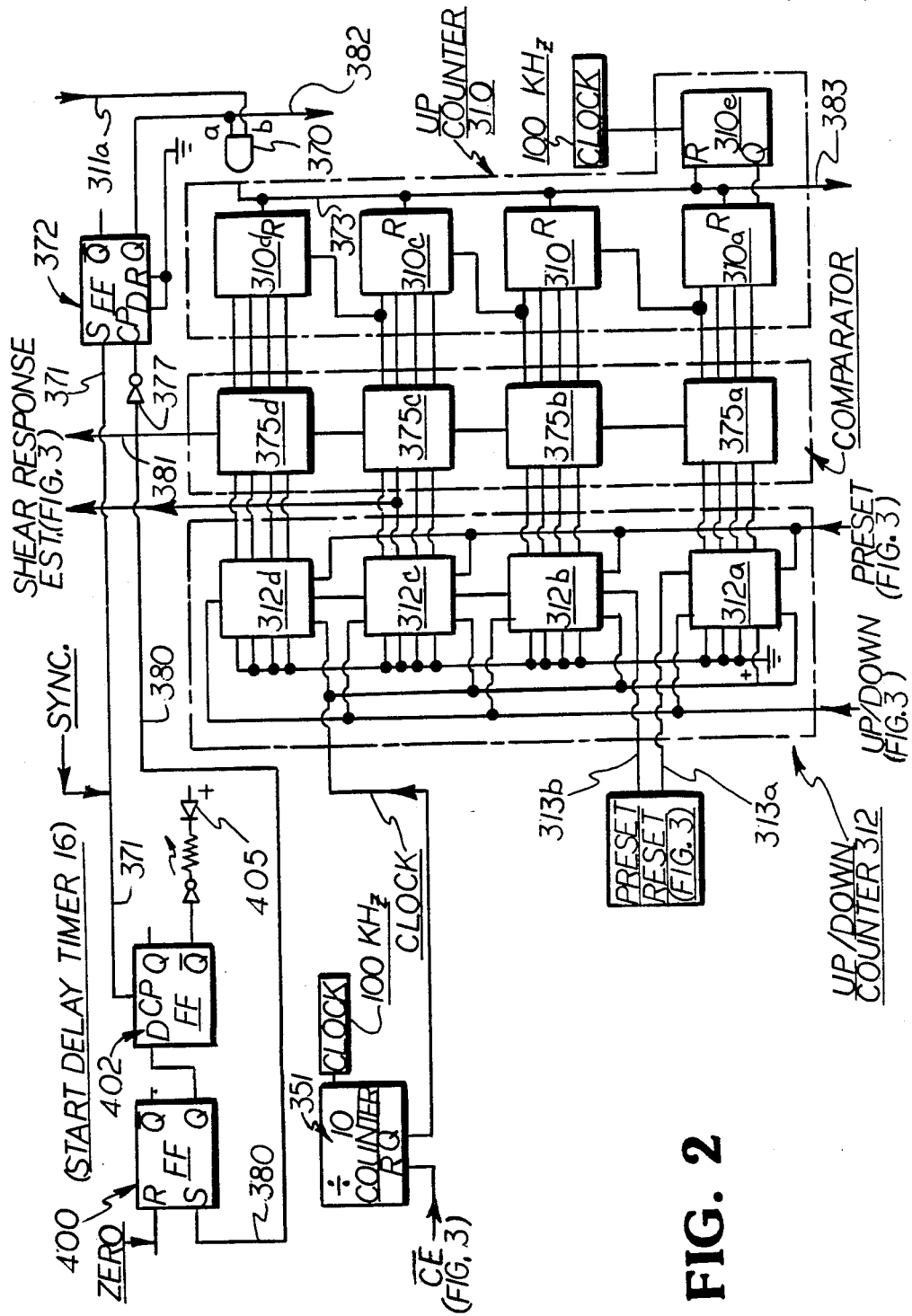
FIG. 2 is a schematic of a start delay timer circuit which operates in cooperation with the synchronization circuit of FIG. 3.
Figure 3:
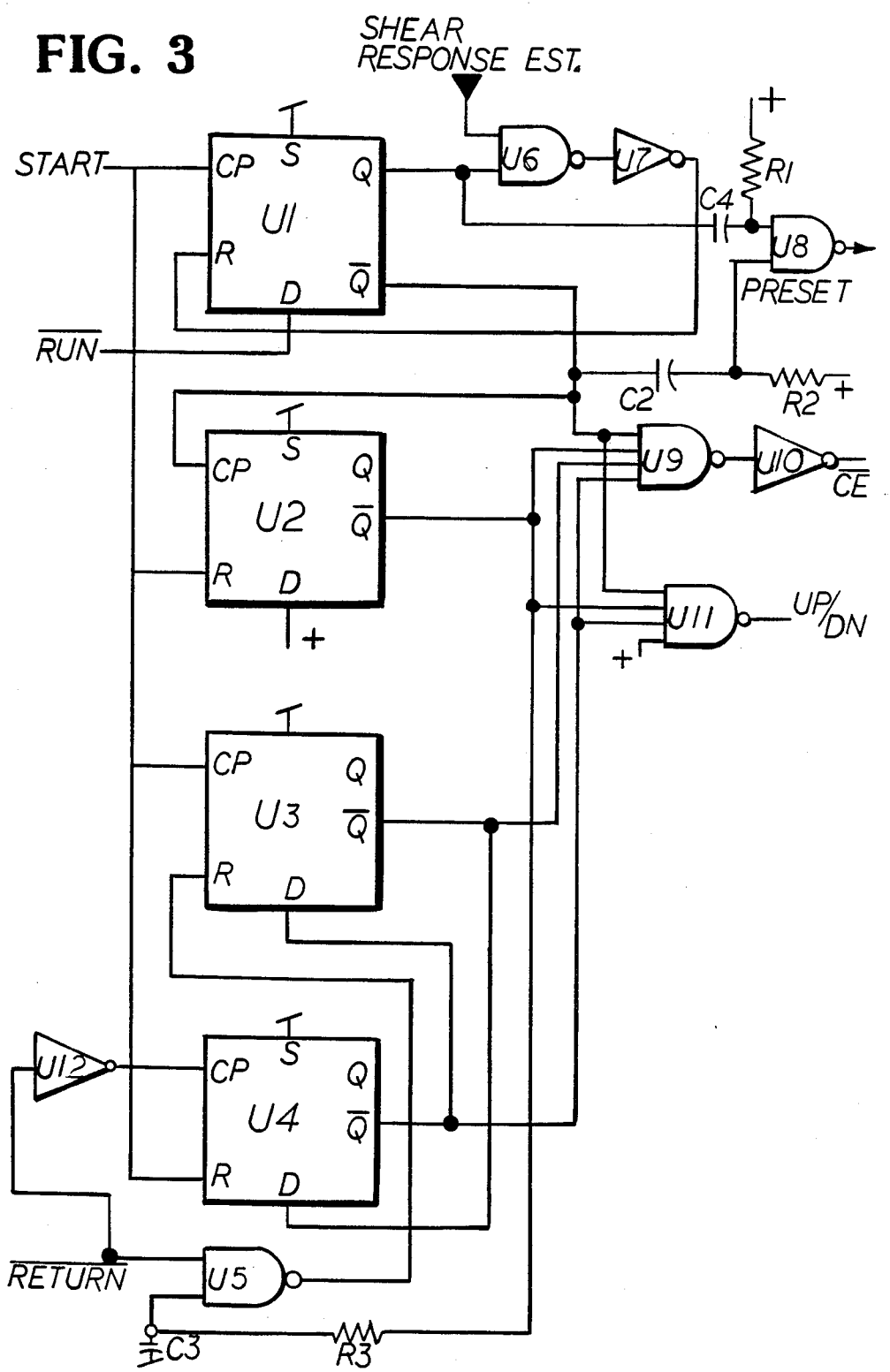
FIG. 3 is a schematic of a synchronization circuit in accordance with the invention.

Reference should now be had to the circuit schematic diagram of FIG. 3, which gives a preferred circuit design for incorporation in a control system for a fluidically driven shear mechanism in accordance with U.S. Pat. No. 4,467,431. This circuit supercedes portions of the set-up circuit 18 of FIGS. 8 and 9 from the '431 patent, as described below, and carries out the former functions of these circuits of initializing the start delay time and adjusting such time during operation of the shears. FIG. 2 shows a modified start delay timer circuit which is designed to interface with the circuit of FIG. 3, as further described below.

While the mechanism is not running, the $\overline{RUN}$ signal is high for the data terminal of flip flop U1; this signal goes low once shear operation commences. The START signals comprise conditioned high pulses obtained while the feeder is running at the cycling rate of the feeder. Circuits for generating both signals are disclosed in U.S. Pat. No. 4,467,431. The set-up sequence operates as follows: a START pulse sets FF U1, and $\overline{Q}$ goes low which acts on NAND gate U8 via differentiator C2, R2 to create a PRESET signal for the Start Delay register 312 (see FIG. 2). The low state of U1's $\overline{Q}$ output holds the CE (count enable) output low via U9 and U10. The UP/DN output of NAND gate U11 is held high by the same signal Q of FF U1, which causes the start delay register (up/down counter 312 (FIG. 2) to count up. The up/down counter 312 (FIG. 2) provides a low SHEAR RESPONSE EST. output only during a predetermined variable time period, which in the preferred embodiment of the present invention is an estimate of the "shear response" period 220' between the on time 204 and the leading edge 206 of the Return Signal. When the count in the Start Delay register 312 reaches the Shear Response Est. period, the signal from U6, U7 resets FF U1 and (via differentiator C1, R1 and NAND gate U8) presets the Start Delay register 312 again. The resetting of U1 ($\overline{Q}$ high) also sets flip flop U2; FF U2 will be reset by the next START pulse. As a result of these actions, up/down counter 312 will obtain a count equal to the cycle time between successive START pulses, less the SHEAR RESPONSE period. This defines the Start Delay period 230' for the first shear cycle.

Figure 1:
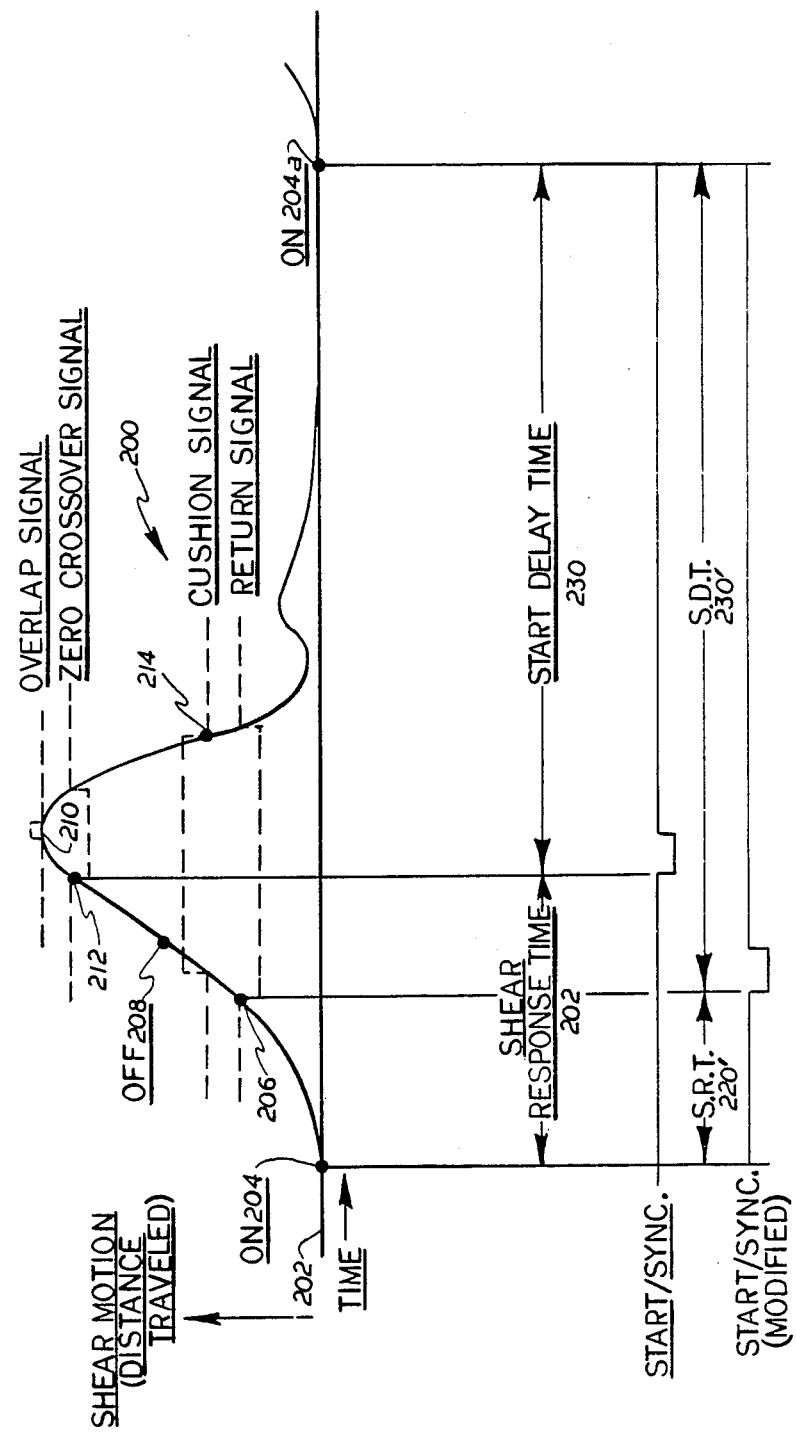
FIG. 1 is a graph of shear blade motion vs. time, with a timing diagram of two different prior art start/sync. schemes.

During the above initialization steps which are continuously repeated, the shear mechanism is not operating and there will be no RETURN signal to flip flop U4, which will therefore stay in its reset state. (The Return signal is provided as a RETURN input to NAND gate U5 and a $\overline{RETURN}$ input to FF U4 via inverter U12.) Although U4 output $\overline{Q}$ will provide a high to the data input to flip flop U3 during the initialization period, the reset terminal of FF U3 will be held high by the R3, C3 time constant through NAND gate U5 long enough to prevent FF U3 from setting during this period. Once the shear mechanism commences operation ($\overline{RUN}$ low), FF1 will be prevented from setting and the above-described repeating sequence of operation will stop. At the commencement of shear operation, Start Delay register 312 will contain the count obtained the last time FF U2 was set, which is the Start Delay based upon SHEAR RESPONSE EST. time as described above. The value in register 312 during ongoing shear operation is changed depending upon whether the START signal precedes the RETURN leading edge signal in a given cycle, or vice versa, as described below. If the START signal precedes the RETURN signal, FF U3 will be set for the difference time thereby creating a "count enable" condition through U9 and U10 while causing a "down" output from UP/DN NAND gate U11 (which does not receive the $\overline{Q}$ output from FF U3). Register 312 will therefore count down until FF U3 is reset by $\overline{RETURN}$ going low—at the leading edge of the Return signal (point 206 in FIG. 1). The setting of FF U3 provides a low to the data input of FF U4, preventing the latter flip flop from being set by the RETURN signal. The above sequence results in decrementing the count in the Start Delay register 312 by a value representing elapsed time between the START signal and the RETURN signal therefore providing the correct Start Delay 230' for the next cycle.

If the RETURN signal precedes the START signal, FF U4 will be set, and its $\overline{Q}$ output to NAND gate U9 and inverter U10 will enable the register to count. This signal to NAND gate U11 causes the Start Delay register 320 to count up The resetting of FF U4 by the subsequent START signal terminates the "count up" command to register 312, and also prevents FF U3 from being set by the START signal (the U3 data input is low). As a result, the Start Delay count in register 312 will be incremented by a count representing the elapsed time between the RETURN signal and the subsequent START signal—thus providing a correct Start Delay 230' for the subsequent cycle.

FIG. 2 illustrates a Start Delay Timer circuit 16 of a similar design to that illustrated in FIG. 8 of U.S. Pat. No. 4,467,431, the circuit of FIG. 2 being modified in order to cooperate with the synchronization circuit of FIG. 3. Various of the inputs and outputs to circuit 16 (reset input 311a, shear valve direction control output 381, display counter outputs 382, 383) serve identical functions to those described in the '431 patent. However, the $\overline{CE}$ input to counter 351, UP/DN and PRESET inputs to Up/Down Counter 312, and SHEAR RESPONSE EST. output, represent outputs from an input to the circuit of FIG. 3, as described above. With further reference to FIG. 3, the START, $\overline{RUN}$, and $\overline{RETURN}$ inputs are all obtained from other portions of the overall control circuit, these signals being produced as disclosed in U.S. Pat. No. 4,467,431.

Those skilled in the art will understand that numerous modifications may be made in the preferred embodiment of the invention disclosed herein without departing from the spirit and scope thereof. Although the control system of the invention has been illustrated in the control of a fluidically driven shear mechanism, it will be understood that the system could be applied to synchronization of other cyclically moving mechanisms of glassware manufacturing apparatus. Moreover, it will be understood that this invention may be embodied in the form of a microprocessor or other computer based control system integrated with appropriate interfacing components.

I claim:

1. A control system for controlling the operation of a shear mechanism which is repetitively cycled to cut identically sized gobs from a runner of molten glass to be formed into containers in a glass machine which has, means for generating sync signals, comprising shear mechanism means for cutting discrete gobs from a runner of molten glass when displaced from a retracted position to an advanced position, means for displacing said shear mechanism means, start delay timer means for starting said displacing means after a timed start delay, means for generating a shear mechanism return signal to return the shear mechanism from its advanced position to its retracted position, first means for calculating a first time offset between a return signal and a later occurring sync signal, second means for calculating a second time offset between a return signal and an earlier occurring sync signal, and means for offsetting said start delay timer means by said first or second time offset so that said control system will be resynchronized each cycle of said shear mechanism.

2. A control system according to claim 1, wherein said first and second calculating means comprises means for counting pulses.

* * * * *